(12) United States Patent
Nakamoto

(10) Patent No.: US 8,472,044 B2
(45) Date of Patent: Jun. 25, 2013

(54) MANAGEMENT APPARATUS AND CONTROL METHOD THEREOF

(75) Inventor: Hisashi Nakamoto, Yokohama (JP)

(73) Assignee: Canon Kabushiki Kaisha (JP)

( * ) Notice: Subject to any disclaimer, the term of this patent is extended or adjusted under 35 U.S.C. 154(b) by 1268 days.

(21) Appl. No.: 11/860,499

(22) Filed: Sep. 24, 2007

(65) Prior Publication Data

US 2008/0106766 A1    May 8, 2008

(30) Foreign Application Priority Data

Sep. 26, 2006    (JP) ................................. 2006-261418

(51) Int. Cl.
*G06F 3/12* (2006.01)

(52) U.S. Cl.
USPC ........................................ 358/1.15; 358/1.14

(58) Field of Classification Search
None
See application file for complete search history.

(56) References Cited

U.S. PATENT DOCUMENTS 7,593,120 B2 *   9/2009   Kitora et al. ................. 358/1.13
8,023,129 B2 *   9/2011   Kawai et al. ................. 358/1.15

FOREIGN PATENT DOCUMENTS

JP    2004-318701 A    11/2004

* cited by examiner

*Primary Examiner* — Twyler Haskins
*Assistant Examiner* — Lennin Rodriguezgonzalez
(74) *Attorney, Agent, or Firm* — Rossi, Kimms & McDowell LLP

(57) ABSTRACT

The data amount of department counters stored in a database is reduced. In department counter information, departments with their data not having been updated in a predetermined period are set as ineffective departments so as not to register these departments in the database. This allows a reduction of department counter data maintained in a central control device because only effective departments are registered in the database. The validity of effective department/ineffective department classification is determined by comparison with the value of charge counters acquired along with the department counters.

13 Claims, 20 Drawing Sheets

| DEPARTMENT | TOTAL COUNTER | MONO-CHROME TOTAL | COLOR TOTAL | COLOR PRINT | COLOR COPY | COLOR SCAN | MONO-CHROME PRINT | MONO-CHROME COPY | MONO-CHROME SCAN |
|---|---|---|---|---|---|---|---|---|---|
| DEPARTMENT 1 | 10 | 5 | 5 | 1 | 1 | 3 | 2 | 2 | 1 |
| DEPARTMENT 2 | 12 | 6 | 6 | 3 | 2 | 1 | 3 | 3 | 0 |
| DEPARTMENT 3 | 3 | 3 | 0 | 0 | 0 | 0 | 0 | 3 | 0 |
| DEPARTMENT 4 | 0 | 0 | 0 | 0 | 0 | 0 | 0 | 0 | 0 |
| DEPARTMENT 5 | 1 | 0 | 1 | 0 | 1 | 0 | 0 | 0 | 0 |
| ... | ... | ... | ... | ... | ... | ... | ... | ... | ... |
| DEPARTMENT 1000 | 30 | 20 | 10 | 5 | 5 | 0 | 10 | 5 | 5 |

FIG. 16

| | DEPARTMENT COUNTERS 1601 | CHARGE COUNTERS 1602 | |
|---|---|---|---|
| COUNTERS COMPARED WITH EACH OTHER → | TOTAL COUNTER | TOTAL COUNTER | ~1603 |
| | MONOCHROME TOTAL | MONOCHROME TOTAL | ~1604 |
| | COLOR TOTAL | — | ~1605 |
| | COLOR PRINT | COLOR PRINT | ~1606 |
| | COLOR COPY | COLOR COPY | ~1607 |
| | COLOR SCAN | — | ~1608 |
| | MONOCHROME PRINT | — | ~1609 |
| | MONOCHROME COPY | — | ~1610 |
| | MONOCHROME SCAN | — | ~1611 |

FIG. 17A

- DEVICE LIST
- DEVICE RUNNING STATUS
- CHARGE COUNTER INFORMATION
- DEPARTMENT TOTAL
- STOCK STATUS OF SUPPLIES
- ENVIRONMENT SETTING
- CUSTOMIZE

| HOME | MANUAL | LOGOUT |

TOTAL COUNTERS FOR ALL DEPARTMENTS (MONTHLY)

PERIOD: 2006-01 TO 2006-03

MONTHLY / TOTAL IN EACH PERIOD 1701

CHANGE PERIOD: 2004-06 ☐ to 2004-08 ☐ CHANGE

| ☐ EXPORT | DEPARTMENT ID | | TOTAL | 2006-01 | 2006-02 | 2006-03 |
|---|---|---|---|---|---|---|
| TOTAL | | TOTAL PRINT | 3780 | 1260 | 1260 | 1260 |
| | | COLOR TOTAL PRINT | — | — | — | — |
| | | MONOCHROME TOTAL PRINT | 1890 | 630 | 630 | 630 |
| | | COLOR COPY | — | — | — | — |
| | | COLOR SCAN | 630 | 210 | 210 | 210 |
| | | COLOR PRINT | 630 | 210 | 210 | 210 |
| | | MONOCHROME COPY | — | — | — | — |
| | | MONOCHROME SCAN | — | — | — | — |
| | | MONOCHROME PRINT | — | — | — | — |

F I G. 17B

| | | | | | | |
|---|---|---|---|---|---|---|
| DETAILS | 0000001 | TOTAL PRINT | 1800 | 600 | 600 | 600 |
| | | COLOR TOTAL PRINT | 900 | 300 | 300 | 300 |
| | | MONOCHROME TOTAL PRINT | 900 | 300 | 300 | 300 |
| | | COLOR COPY | 300 | 100 | 100 | 100 |
| | | COLOR SCAN | 300 | 100 | 100 | 100 |
| | | COLOR PRINT | 300 | 100 | 100 | 100 |
| | | MONOCHROME COPY | 300 | 100 | 100 | 100 |
| | | MONOCHROME SCAN | 300 | 100 | 100 | 100 |
| | | MONOCHROME PRINT | 300 | 100 | 100 | 100 |
| DETAILS | 0000002 | TOTAL PRINT | 1800 | 600 | 600 | 600 |
| | | COLOR TOTAL PRINT | 900 | 300 | 300 | 300 |
| | | MONOCHROME TOTAL PRINT | 900 | 300 | 300 | 300 |
| | | COLOR COPY | 300 | 100 | 100 | 100 |
| | | COLOR SCAN | 300 | 100 | 100 | 100 |
| | | COLOR PRINT | 300 | 100 | 100 | 100 |
| | | MONOCHROME COPY | 300 | 100 | 100 | 100 |
| | | MONOCHROME SCAN | 300 | 100 | 100 | 100 |

1702

1700

◀ RETURN

MANAGEMENT APPARATUS AND CONTROL METHOD THEREOF

BACKGROUND OF THE INVENTION

1. Field of the Invention

The present invention relates to a mechanism for acquiring counter values.

2. Description of the Related Art

There has been a monitoring system that remotely monitors the operational status of peripheral apparatuses such as image forming apparatuses. This monitoring apparatus treats data called department counters of the image forming apparatuses in the following manner.

A monitoring center host periodically collects department counter information from image forming apparatuses placed in customer sites and manages the data by registering it in a database. A department is a customer-defined group/users, and a department counter is a counter indicating the total value of the number of times all users belonging to the group used an image forming apparatus.

Since the department counters are managed on a department basis, an increase in the number of departments results in an increase in the number of monitored counters. This causes an increase in the monitoring load on the monitoring center host and in the data size, leading to increased consumption of memory resources and processor resources. Therefore, attempts to reduce the data size have been made, for example as described in a Japanese Patent Laid-Open No. 2004-318701 and so on.

According to Japanese Patent Laid-Open No. 2004-318701, an image forming apparatus associates log information about each department with a department ID and a department name change number on a job basis. It also manages a department name in association with the department ID and the department name change number. Therefore, when only the department name is changed without a change in the department ID, only the department name change number can be changed to store it along with the log information. This allows a reduction in the data size because the department name is not directly associated with the log information.

With the invention in this Japanese Patent Laid-Open No. 2004-318701, the data size may be reduced by the size of department names compared to the case where the department names themselves are stored in association with the log information. That is, the data size of individual log information may be reduced. However, even though the data size of the individual log information is reduced, the data amount as a whole increases if the number of managed image forming apparatuses increases and the number of departments increases.

SUMMARY OF THE INVENTION

The present invention has been made in the light of the above conventional example and provides a mechanism capable of efficiently addressing counter values with a large data amount. It is an object of the present invention to provide a management apparatus and its control method that provide a reduction in the data amount to be addressed and thereby effective use of resources even when data to be managed increases due to an increase in the number of managed image forming apparatuses and the number of departments.

The present invention is configured as a management apparatus that manages counters of each department for at least one image forming apparatus, including:

a setting unit that sets departments as storage targets for a storage unit that stores counter values;

a receiving unit that receives counter values of each department for the image forming apparatus;

a comparing unit that compares a sum total value representing the sum of the counter values of each department with an effective total value representing the sum of counter values of the storage target departments among the counter values of each department received by the receiving unit; and a storage control unit that stores, in the storage unit, the counter values received by the receiving unit corresponding to the storage target departments set by the setting unit if the comparison by the comparing unit indicates that the sum total value and the effective total value are equal.

According to the present invention, counter values with a large data amount can be efficiently addressed. Storing only effective department counters in a database allows reduction in the number of data accesses and in the number of registered data items, thereby providing effective use of resources.

Further features of the present invention will become apparent from the following description of exemplary embodiments (with reference to the attached drawings).

BRIEF DESCRIPTION OF THE DRAWINGS

FIG. 16 shows the types of the department counters and the charge counters used by the central control device 111 for department counter display;

FIGS. 17A and 17B show a department counter screen displayed on a web page of the central control device 111;

DESCRIPTION OF THE EMBODIMENTS

First Embodiment

System Configuration

Figure 1:
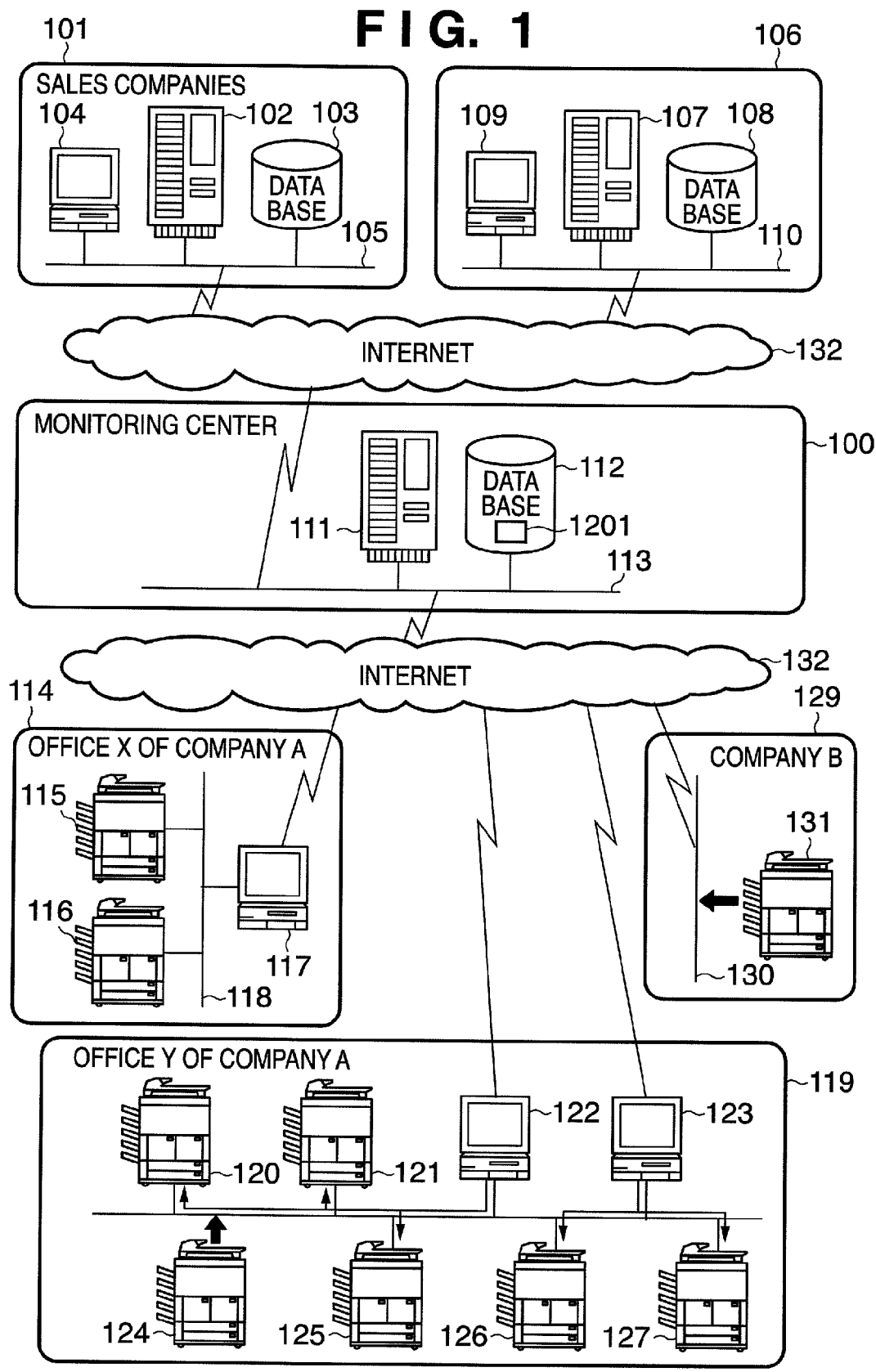
FIG. 1 shows a system configuration according to an embodiment.

FIG. 1 shows the overview of a monitoring system in an embodiment. In FIG. 1, a plurality of sales company systems such as a system 101 and a system 106 are connected to the monitoring system. The systems include databases 103 and 108, respectively, for storing sales information about their serviced regions and customers and information about the monitoring system.

The systems 101 and 106 of the sales companies include hosts 102 and 107, respectively, that control registration of data in the databases 103 and 108, modification of the data, and so on by request from clients. PCs 104 and 109 work as the clients of the databases, and they can also access a website provided by a central control device 111 serving as a monitoring center host and perform data browsing and so on. The hosts 102 and 107 have an operating unit and a display unit, so that they can also serve as the PCs 104 and 109. The host 102, the database 103, and the PC 104 are interconnected via a LAN 105. The host 107, the database 108, and the PC 109 are interconnected via a LAN 110. Although the systems of the sales companies are each shown to be composed of a plurality of apparatuses in FIG. 1, the databases 103 and 108 may physically exist inside the hosts 102 and 107 respectively. Further, the databases may exist elsewhere over the Internet as long as they can be accessed by the hosts 102 and 107. Thus, the systems may each be composed of a plurality of apparatuses or implemented as a single apparatus.

A monitoring center 100 exists between the sales companies and customers. The monitoring center 100 includes the central control device 111 serving as a host computer of the monitoring center. A database 112 is history storage means for accumulating monitoring information, counters (especially, department counters) of image forming apparatuses collected from the customers, failure history information, a failure pattern table, and so on. Departments are classified into effective departments each having a recent use history indicating the recent use of an image forming apparatus by users belonging to each department, and ineffective departments each not having the recent use history. The database 112 accumulates and stores department counters for the effective departments but not those for the ineffective departments. If the latest counter value for a certain department is different from the immediately preceding collected counter value, it can be determined that the department has the recent use history. Based on this recent use history, the central control device dynamically classifies the departments into the effective departments and the ineffective departments. This process will be described later with reference to FIGS. 14 and 15.

In the monitoring center 100, the central control device 111 and the database 112 are interconnected via a LAN 113, which can connect to the Internet. The database 112 may physically exist inside the central control device 111. Further, the database 112 may exist elsewhere over the Internet as long as it can be accessed by the central control device 111.

The central control device 111 has functions of: collecting information about the monitored image forming apparatuses from monitoring apparatuses 117, 122, and 123 provided at sites where the image forming apparatuses are placed, and from an image forming apparatus 131 that includes a monitoring apparatus; processing the information; and externally providing a warning and so on. The information about the image forming apparatuses includes information indicating the operational status (including failure information) and counter information indicating the number of times the printing and copying were performed. The central control device 111 also has a function of distributing the collected or processed information, for example to the hosts 102 and 107 of the sales companies. Exemplary operational statuses may include out-of-toner, door opened, drum change, no cartridge, cooling fan failure, substrate failure, dirt on a platen glass, out of strip of staples, insufficient light for a paper-feed sensor, and so on. Also, font memory overflow, rendering error, fixing device failure, counter failure, double-sided print unit failure, paper jamming, and so on may be included. The counter information may include charge counters based on which the sales companies collect charges, department counters aggregated for each customer-defined department, size counters aggregated for each paper size, part counters indicating the degree of wear-out of parts in the image forming apparatuses, and so on. The charge counters and the department counters are provided independently from each other. The charge counters are irrelevant to the departments and used for purposes such as collecting charges. The department counters are separate from the charge counters and each aggregates an item on a department basis. The charge counters and the department counters each include individual counters corresponding to operations (e.g., color copy and print) and a total counter holding the total value of the individual counters. When printing is performed, a counter value of a corresponding operation and the total counter value are incremented. The value of the total counter of the charge counters is equal to the total value of the total counters of the department counters. An exemplary relationship between the charge counters and the department counters is shown in FIG. 16 to be described later. FIG. 16 is a mere example, and items such as paper size and part counters may also be included in practice.

A part counter indicates the number of rotations for a part such as a drum, or the time of usage (seconds) for a part such as a scanner lamp, for example. The part counter is also provided with a charge counter and department counters.

Further, the sales company hosts 102 and 107 can each register information about their monitored image forming apparatuses and monitoring settings in the central control device 111. The central control device 111 can merge and centrally manage the information about the monitored image forming apparatuses and the monitoring settings registered by all sales company hosts. The central control device 111 can also make monitoring settings for the monitoring apparatuses 117, 122, and 123 and the image forming apparatus 131.

The central control device 111 provides computers connected over the Internet with a web page on which information accumulated in the database 112 or processed information is written in HTML. This web page provides browsing content limited by sales company, customer, and user's authority, according to user authentication. Further, certain data can be modified through the web page.

FIG. 1 shows only one central control device 111 and one database 112. However, in practice, there may be a case of having a plurality of central control devices and databases perform distributed processing in order to distribute load for collecting information from many image forming apparatuses and monitoring apparatuses.

Next, the system configuration on the customer side will be described. There is a plurality of different customer environments. FIG. 1 shows customer systems 114, 119, and 129. In the customer system 114 (an office X of a company A), image forming apparatuses 115 and 116 connected to a LAN 118 connected to the Internet are monitored by the monitoring apparatus 117, which is communicating with the central control device 111 over the Internet. In the customer system 119 (an office Y of the company A), image forming apparatuses on a LAN 128 are managed by the monitoring apparatuses 122 and 123. The monitoring apparatus 122 manages image forming apparatuses 120, 121, 124, and 125, whereas the monitoring apparatus 123 manages image forming apparatus 126 and 127. The monitoring apparatuses 117, 122, and 123 are connected with a database 133 (not shown). The monitoring apparatuses accumulate information collected from the image forming apparatuses 115 and 116 and store the result of processing of the accumulated data, and also store monitoring settings for the image forming apparatuses in the database 133 (not shown). The database 133 not shown may be connected to the LAN 118 and exist independently. Further, the database 133 may exist elsewhere over the Internet as long as it can be accessed by the monitoring apparatuses 117, 122, and 123. The monitoring apparatuses transmit status information (e.g., the occurrence of a failure, etc.) about the image forming apparatuses to the central control device 111 whenever they receive the status information from the image forming apparatuses. The monitoring apparatuses also collect values of the department counters maintained in their managed image forming apparatuses at predetermined times and transmit the values to the central control device 111. Alternatively, the monitoring apparatuses themselves may have the department counters for their managed image forming apparatuses. In that case, the department counters maintained in the monitoring apparatuses are transmitted to the central control device.

In the customer 129 (a company B), the image forming apparatus 131 connected to a LAN 130 connected to the Internet is directly communicating with the central control device 111 over the Internet. The image forming apparatus 131 is actively transmitting information about itself (e.g., the counter information or the occurrence of a failure, etc.) to the central control device 111. A PC 134 (not shown) has a web browser and can connect to the central control device 111 not only from the customer environment but directly over the Internet to browse the aforementioned web page provided by the central control device 111.

The following points need to be noted.

(1) The HTTP/SOAP protocol can be used in communications over the Internet in the configuration in FIG. 1. SOAP is an abbreviation of Simple Object Access Protocol. SOAP is an XML (extended Markup Language) based protocol for a computer to invoke data or a service of another computer. In this example, SOAP is implemented on HTTP. Communications using SOAP exchange SOAP messages in which auxiliary information is added to an XML document. Therefore, a computer supporting SOAP is provided with a SOAP message generating unit that generates SOAP messages, and a SOAP message interpreting unit that interprets SOAP messages. In this embodiment, the status information about the image forming apparatuses is transmitted in a SOAP message to the central control device 111.

(2) It has been described that the image forming apparatuses in the company A communicate with the central control device 111 via the monitoring apparatuses. However, by modifying settings, they may communicate with the central control device 111 without intervention of the monitoring apparatuses in the same manner as the image forming apparatus 131 provided in the company B.

Hardware Configuration

Figure 2:
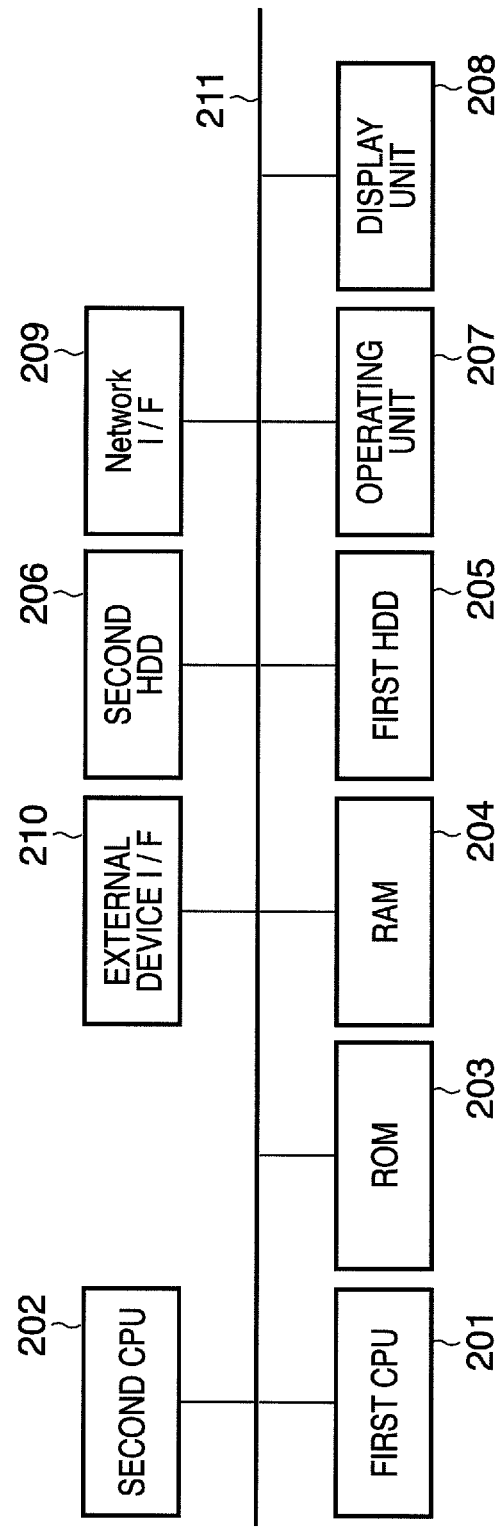
FIG. 2 shows an exemplary hardware configuration of hosts 102 and 107.

FIG. 2 shows a hardware configuration diagram of the central control device 111. It is also applied to the hardware configuration of the hosts 102 and 107. In FIG. 2, a first CPU 201 and a second CPU 202 control various kinds of processing on this device. An unrewritable ROM 203 stores programs and data related to the processing on this device. A RAM 204 can electrically store temporary data related to the processing on this device and is rewritable. A first HDD 205 and a second HDD 206 store programs, data, and temporary data related to the processing on this device, information about the monitored image forming apparatuses according to the present invention, information collected from the image forming apparatuses, and so on. For example, the part counters, the charge counters, and the department counters are stored in these hard disks. An input device 207 includes a keyboard and a pointing device that receive instruction inputs to this device. A display unit 208 displays the operational status of this device and information that is output by the programs running on this device. A network I/F 209 connects to the LAN and the Internet via a network and exchanges information with the outside. An external device I/F 210 connects devices such as an external storage device. These components are coupled with each other via a system bus 211 to exchange data. The first CPU 201 or the second CPU 202 executes a program for a procedure shown in FIGS. 14 and 15.

Figure 3:
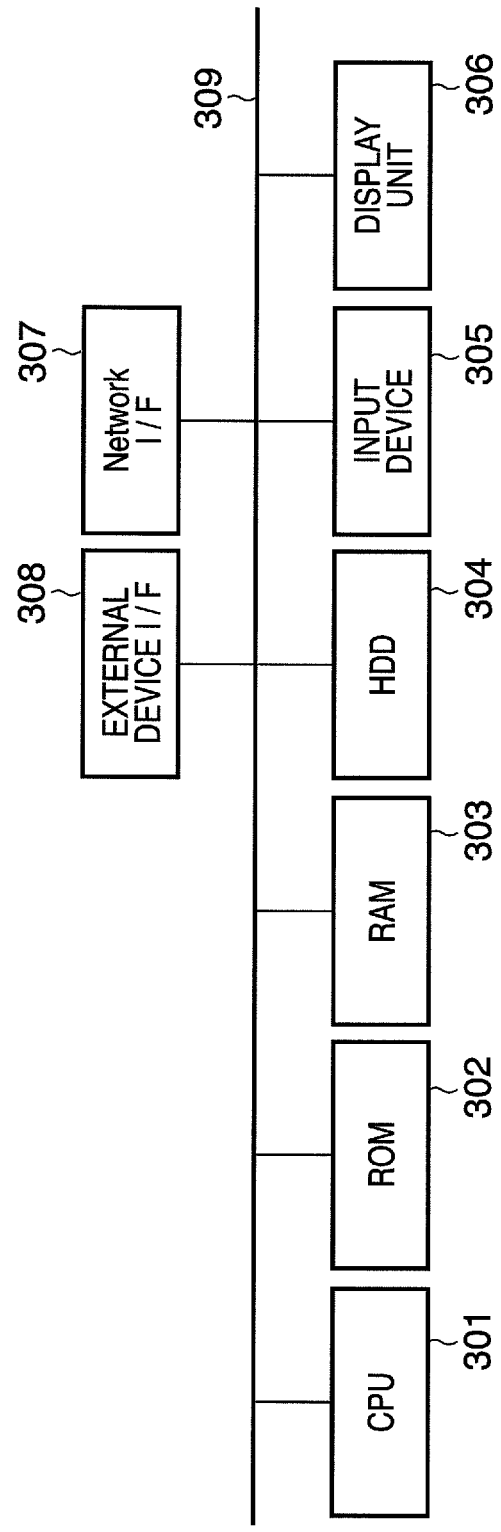
FIG. 3 shows an exemplary hardware configuration of monitoring apparatuses 117, 122, and 123.

FIG. 3 shows a hardware configuration diagram of the monitoring apparatuses 117, 122, and 123. It can also be applied to a hardware configuration diagram of the PCs 104, 109, and 134. A CPU 301 controls various kinds of processing on this apparatus. A ROM 302 stores programs and data related to the processing on this apparatus and is unrewritable. A RAM 303 can electrically store temporary data related to the processing on this apparatus and is rewritable. In the monitoring apparatus 117, an HDD 304 stores programs, data, and temporary data related to the processing on this apparatus, information about the monitored image forming apparatuses, information collected from the image forming apparatuses, and so on. In the PCs 104, 109, and 134, the HDD 304 stores a web browser and so on. An input device 305 includes a keyboard and a pointing device that receive instruction inputs to this apparatus. A display unit 306 displays the operational status of this apparatus and information that is output by the programs running on this apparatus. A network I/F 307 connects to the LAN and the Internet via a network and exchanges information with the outside. An external device I/F 308 connects devices such as an external storage device. These components are coupled with each other via a system bus 309 to exchange data.

Figure 4:
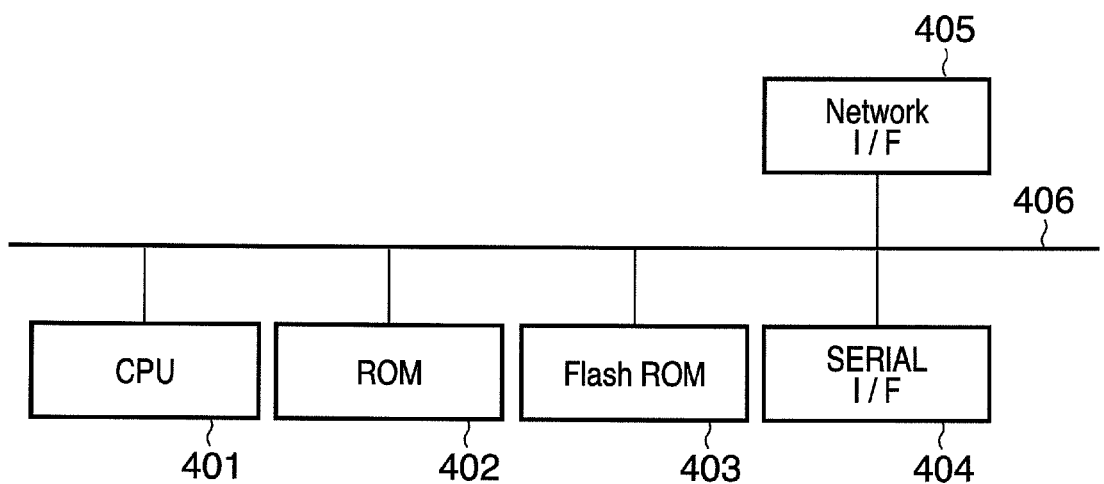
FIG. 4 shows another form of exemplary hardware configuration of the monitoring apparatuses 117, 122, and 123.

FIG. 4 is another form of hardware configuration diagram of the monitoring apparatuses 117, 122, and 123. A CPU 401 controls various kinds of processing on this apparatus. A ROM 402 stores programs and data related to the processing on this apparatus and is unrewritable. A flash ROM 403 stores data and temporary data related to the processing on this apparatus, information about the monitored image forming apparatuses, information collected from the image forming apparatuses, and so on. A serial I/F 404 is used by the programs on this apparatus to output errors and logs, and can connect a terminal by using a serial cable. A network I/F 405 connects to the LAN and the Internet via a network and exchanges information with the outside. These components are coupled with each other via a system bus 406 to exchange data.

Figure 5:
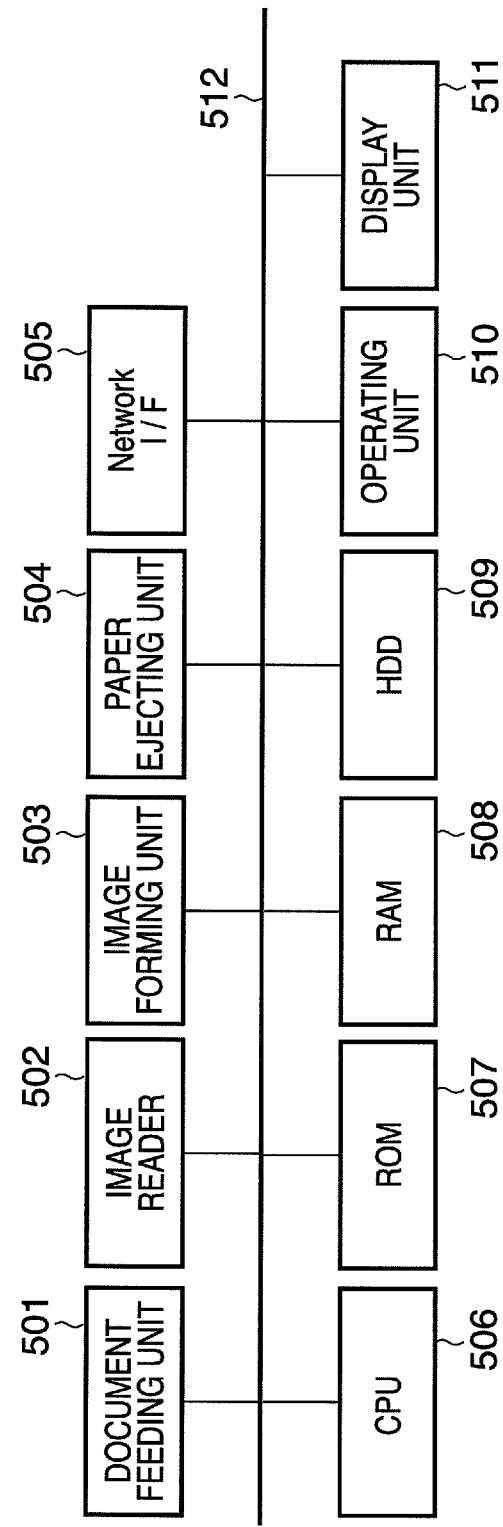
FIG. 5 shows an exemplary hardware configuration of the image forming apparatuses 115, 116, 120, 121, 124, 125, 126, 127, and 131.

FIG. 5 shows a hardware configuration diagram of the image forming apparatuses 115, 116, 120, 121, 124, 125, 126, 127, and 131. Specific examples of the image forming apparatuses may include a multifunction machine that integrates functions of a printer and a facsimile, a printer that receives data from a PC or the like and prints the data (including an electrophotographic printer and an ink-jet printer), a scanner, and a facsimile. This figure shows the configuration of a multifunction machine as an exemplary image forming apparatus.

An image reader 502 reads a document with a document feeding unit 501. The image reader 502 and an image forming unit 503 convert a read document or data received via a network into a print image and print it out. A paper ejecting unit 504 ejects printed-out paper and subjects the paper to processing such as sorting and stapling. A network I/F 505 connects to the LAN and the Internet via a network and exchanges information with the outside. A CPU 506 controls various kinds of processing on this apparatus. The CPU 506 monitors the operational status of the image forming apparatus and, on the occurrence of a particular event such as a failure, transmits status information indicating the state of the event to a predetermined destination, for example the central control device 111 or the monitoring apparatus. A ROM 507, which is nonvolatile storage means, stores programs and data related to the processing on this apparatus. A rewritable RAM 508 electrically stores temporary data related to the processing on this apparatus. An HDD 509 stores programs, data, and temporary data related to the processing on this apparatus, user data transmitted to this apparatus, and so on. An operating unit 510 receives instruction inputs to this apparatus. A display unit 511 displays the operational state of this apparatus and information related to operations performed on the operating unit 510. These components are coupled with each other via a system bus 512 to exchange data.

In the image forming apparatus 131, which itself has a function of actively transmitting monitoring information, the ROM 507 or the HDD 509 stores a program and data related to processing of transmitting the monitoring data.

Software

Figure 6:
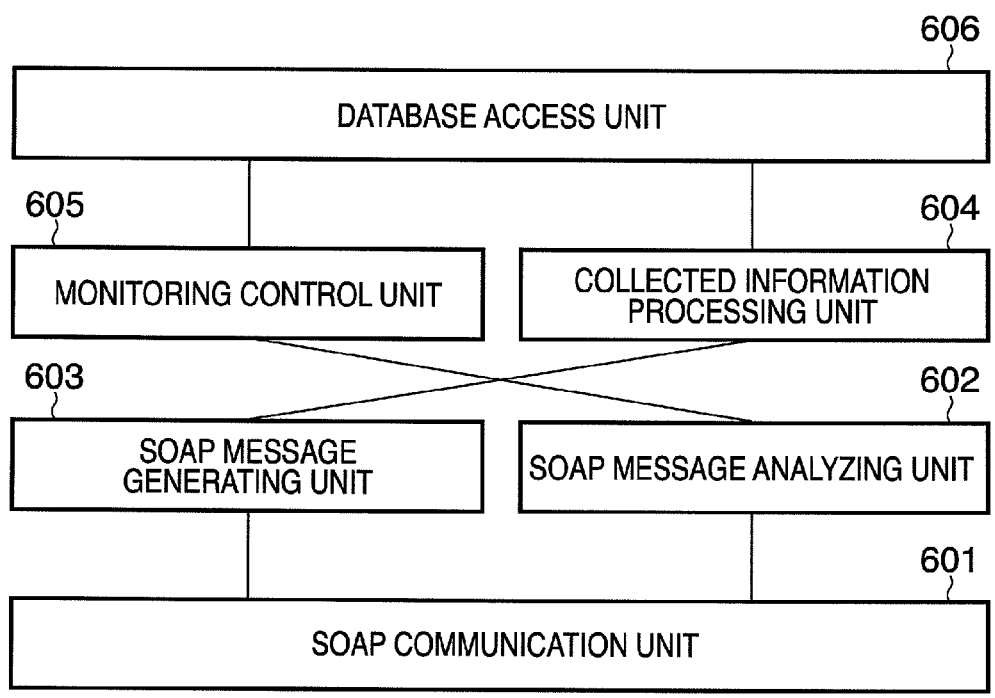
FIG. 6 shows an exemplary software configuration of part related to an image forming apparatus monitoring system in a central control device 111.

FIG. 6 shows a software configuration diagram of part related to the image forming apparatus monitoring system in the central control device 111. A SOAP communication unit 601 passes SOAP data received from the monitoring apparatus 117 or the image forming apparatus 131 via the network I/F 209 to a SOAP message analyzing unit 602. The SOAP communication unit 601 also transmits SOAP data generated by a SOAP message generating unit 603 to the monitoring apparatus 117 or the image forming apparatus 131 via the network I/F 209.

A collected information processing unit 604 stores information received from the managed monitoring apparatus 117 or image forming apparatus 131 in the database 112 via a database access unit 606 directly or after processing the information. A failure pattern table, a failure history table, a department counter table 1201, and so on are stored in the database 112.

The collected information processing unit 604 implements functions related to the monitoring center. For example, based on the information received from the monitored monitoring apparatus 117 or image forming apparatus 131 and the data stored in the database 112, the collected information processing unit 604 informs a relevant serviceperson or a customer manager of aggregate counter information and error information.

A monitoring control unit 605 manages a schedule of collecting information about the monitoring apparatus 117 or the image forming apparatus 131 and controls the details and method of monitoring. Further, as necessary, the monitoring control unit 605 transmits instructions to the monitored monitoring apparatus 117 or image forming apparatus 131 via the SOAP message generating unit 603, the SOAP communication unit 601, and the network I/F 209.

Figure 7:
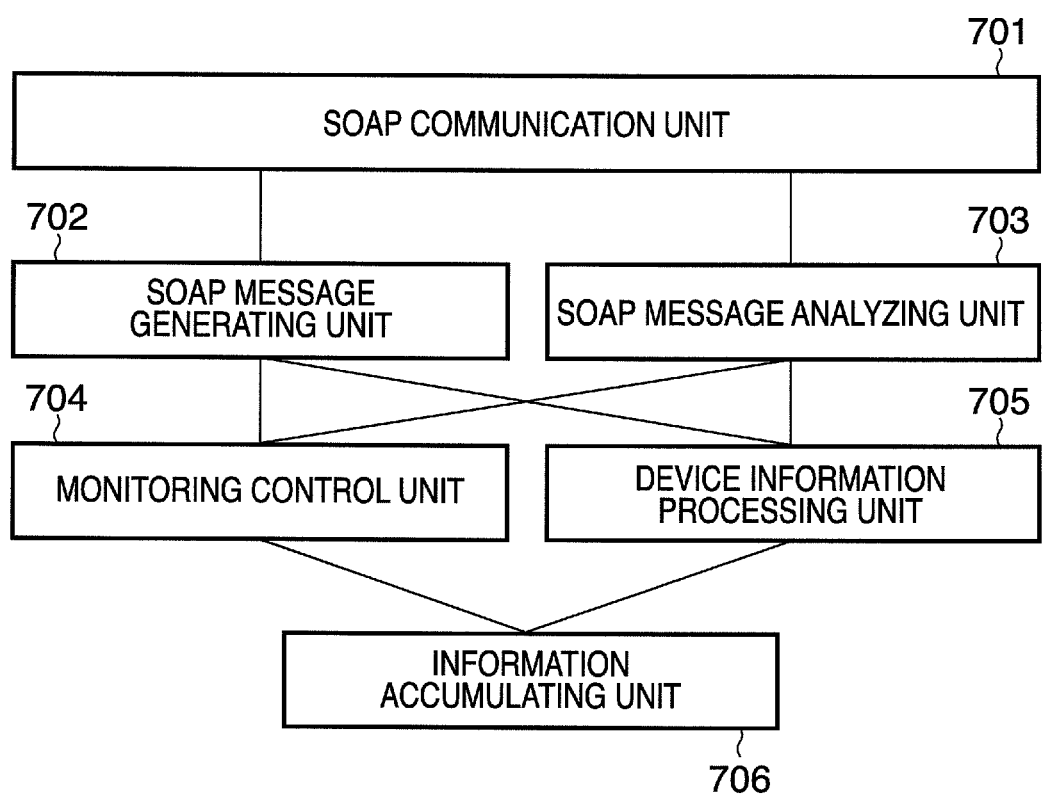
FIG. 7 shows an exemplary software configuration of part related to the image forming apparatus monitoring system in the monitoring apparatuses 117, 122, and 123.

FIG. 7 shows a software configuration diagram of part related to the image forming apparatus monitoring system in the monitoring apparatuses 117, 122, and 123.

A SOAP communication unit 701 passes SOAP data received from the central control device 111 via the network I/Fs 307 and 405 to a SOAP message analyzing unit 703. The SOAP communication unit 701 also transmits SOAP data generated by a SOAP message generating unit 702 to the central control device 111 via the network I/Fs 307 and 405.

A monitoring control unit 704, according to monitoring settings (to be described later) set by the central control device 111, updates image forming apparatus monitoring information maintained in an information accumulating unit, acquires information about the image forming apparatuses 115 and 116, and manages a schedule.

According to the schedule managed by the monitoring control unit 704, a device information processing unit 705 accumulates in the information accumulating unit 706 the counter information and information about service calls, jamming, out-of-toner, and so on actively collected by this apparatus from the image forming apparatuses 115 and 116. Alternatively, this accumulation is performed depending on the status of the image forming apparatuses 115 and 116.

The data accumulated in the information accumulating unit 706 is passed directly to the SOAP message generating unit 702 via the device information processing unit 705 and transmitted to the central control device 111. Alternatively, the data may be interpreted and processed in the device information processing unit 705 before passed to the SOAP message generating unit 702 and transmitted to the central control device 111.

Figure 8:
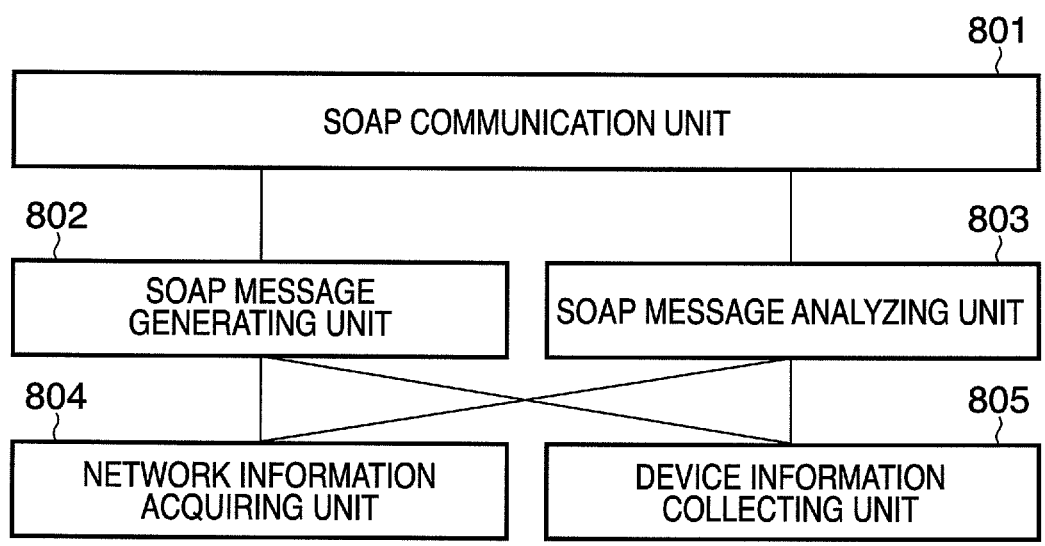
FIG. 8 shows an exemplary software configuration of part related to the image forming apparatus monitoring system in the image forming apparatuses 115, 116, 120, 121, 124, 125, 126, 127, and 131.

FIG. 8 shows a software configuration diagram of part related to the image forming apparatus monitoring system in the image forming apparatuses 115, 116, 120, 121, 124, 125, 126, 127, and 131. It corresponds to the functions of the monitoring apparatus shown in FIG. 7 incorporated into the image forming apparatuses.

A SOAP communication unit 801 passes SOAP data received from the central control device 111 via the network I/F 505 to a SOAP message analyzing unit 803. The SOAP communication unit 801 also transmits SOAP data generated by a SOAP message generating unit 802 to the central control device 111 via the network I/F 505.

A network information acquiring unit 804 can automatically acquire an IP address, a DNS server, and a gateway address in the DHCP environment.

The network information acquiring unit 804 also acquires any network information that is input from the operating unit 510 and stored in the HDD 509.

A device information collecting unit 805 acquires internally maintained counter information according to a schedule inside this multifunction machine or under the instruction of the central control device 111. The device information collecting unit 805 also acquires information about internally occurring service calls, jamming, out-of-toner, and so on. The counter information includes the department counters.

The acquired data may be passed directly to the SOAP message generating unit 802 and transmitted to the central control device 111, or may be accumulated, interpreted, and processed in the device information collecting unit 805 before passed to the SOAP message generating unit 802 and transmitted to the central control device 111.

Figure 9:
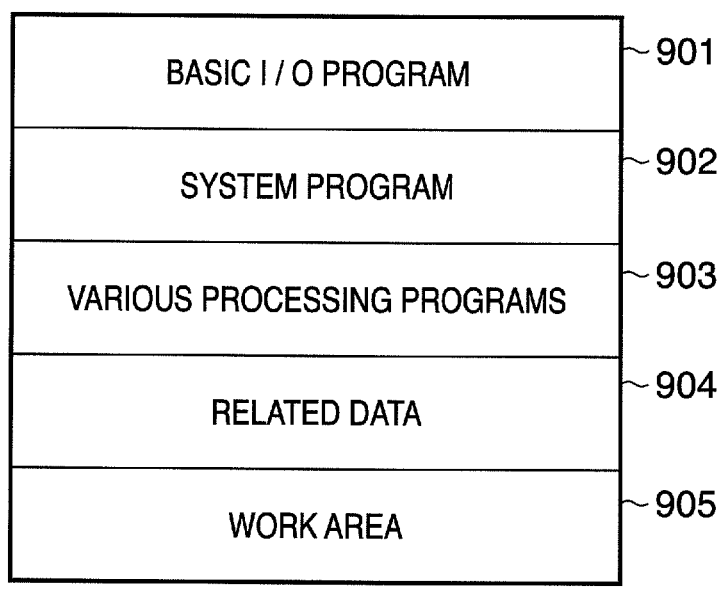
FIG. 9 shows the structure of a memory map in the central control device 111, the monitoring apparatuses 117, 122, and 123, or the image forming apparatuses 115, 116, 120, 121 124, 125, 126, 127, and 131.

FIG. 9 is a diagram showing the structure of a memory map in the central control device 111, the monitoring apparatuses 117, 122, and 123, or the image forming apparatuses 115, 116, 120, 121 124, 125, 126, 127, and 131. The diagram shows the memory map where, in execution of the processing program according to the present invention, programs are loaded in the RAM 204 for the central control device 111, in the RAM 303 or the flash ROM 403 for the monitoring apparatus 117, or in the RAM 508 for the image forming apparatuses.

The memory map is composed of a basic I/O program 901, a system program 902, various processing programs 903 including the processing program according to this embodiment, an area 904 for storing related data, and a work area 905 for the programs. The basic I/O program 901 controls inputs and outputs on this apparatus. The system program 902 provides the various processing programs with an operating environment. If the areas used for 901 to 905 are insufficient due to the capacity constraint, the first HDD 205 or the second HDD 206 may be used as part of the area of the RAM 204, or the HDD 304 may be used as part of the area of the RAM 303, or the HDD 509 may be used as part of the area of the RAM 508.

Acquisition of Department Counters by Monitoring Center

Figure 10:
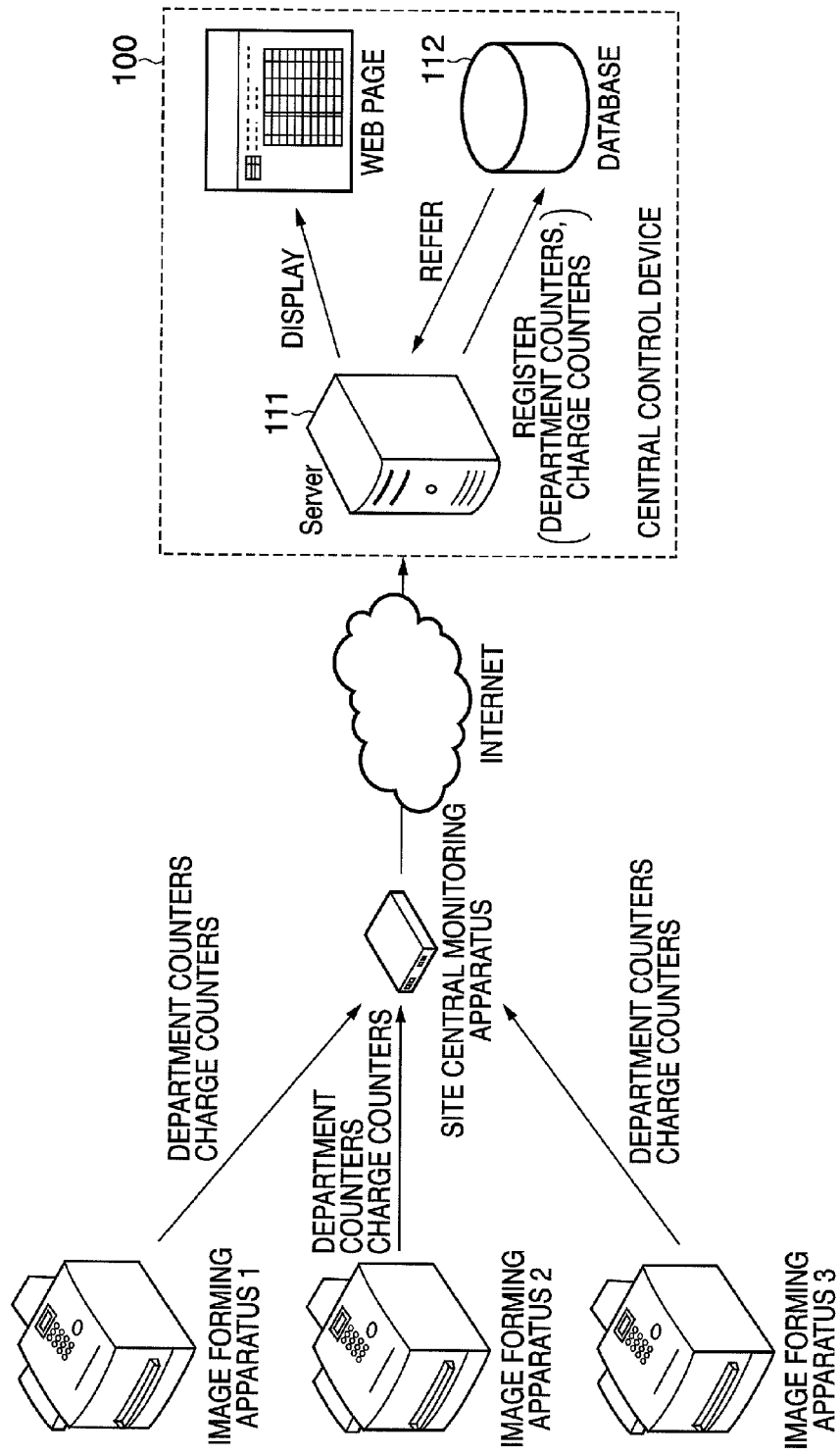
FIG. 10 shows a conceptual view in which department counters and charge counters from the image forming apparatuses are transmitted to the central control device 111.

FIG. 10 shows a conceptual view in which the central control device 111 acquires the department counters from the monitoring apparatuses 117, 122, and 123 or the image forming apparatus 131 (not shown). The monitoring apparatuses connected to the image forming apparatuses periodically acquire both the department counters and the charge counters at the same time from each image forming apparatus. These counters are transmitted to the central control device 111, which stores them in the database 112. The central control device 111 displays information such as the counter values of the department counters on the web page for reference by the customers and the sales companies.

Figure 11:
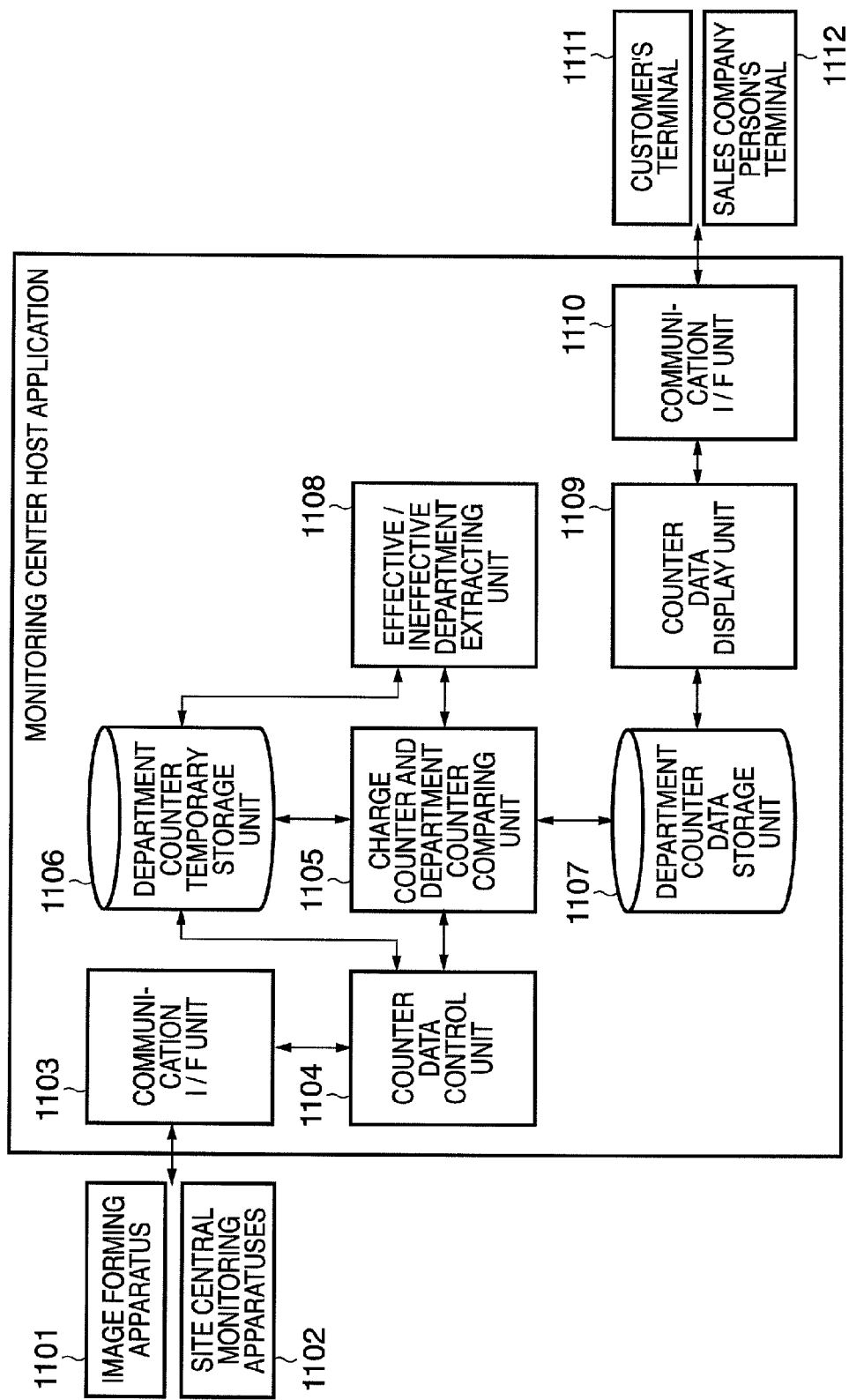
FIG. 11 shows an exemplary software block diagram of the central control device 111.

FIG. 11 shows a software block diagram of the central control device 111 (i.e., the monitoring center host). Reference numeral 1101 denotes the image forming apparatus 131. Reference numeral 1102 denotes the monitoring apparatuses 117, 122, and 123 managing the image forming apparatuses 115, 116, 120, 121, 124 125, 126, and 127.

The image forming apparatus 1101 and the monitoring apparatuses 1102 transmit counter data (including at least the counter values) related to the departments and charges to the central control device 111. A communication I/F unit 1103 receives the counter data transmitted from the monitoring apparatuses 1102 and the image forming apparatus 1101. The counter data received in the communication I/F unit 1103 is analyzed in a counter data control unit 1104, and the department counter values are stored in a department counter temporary storage unit 1106. Although not shown, the charge counter values are stored in a charge counter storage area. A charge counter and department counter comparing unit 1105 extracts department counter values corresponding to the effective departments from the department counter temporary storage unit 1106 and compares them with the charge total counter value. It is assumed here that one or more effective departments exist, and that information as to which departments are the effective departments is preset.

If the comparison in the charge counter and department counter comparing unit 1105 indicates that the total counter value of the charge counters is equal to the total value of the total counters of the department counters for the effective departments, the department counters for the effective departments are stored in a department counter data storage unit 1107. In principle, the total counter value of the charge counters should be equal to the total counter value (total value) for all departments. If the preset effective departments do not match departments actually being used in the image forming apparatus and therefore the total counter value of the charge counters is not equal to the total counter value for all departments, an effective/ineffective department extracting unit 1108 subjects the department counter data to effective/ineffective department classification. With this classification, the effective/ineffective department extracting unit 1108 also functions as setting means for updating the setting of effective departments for which the counter values should be stored.

The department counters subjected to the classification in the effective/ineffective department extracting unit 1108 have their values reexamined by the charge counter and department counter comparing unit 1105. If the validity of the examination result is confirmed, the department counter values for the effective departments are stored in the department counter data storage unit 1107. Then, the department counter data saved in the temporary storage area 1106 is deleted.

The data stored in the department counter data storage unit 1107 is displayed by a counter data display unit 1109 on the web page. A customer's terminal 1111 and a sales company person's terminal 1112 access the web page via a communication I/F 1110 to refer to the department counter information.

Figure 12:
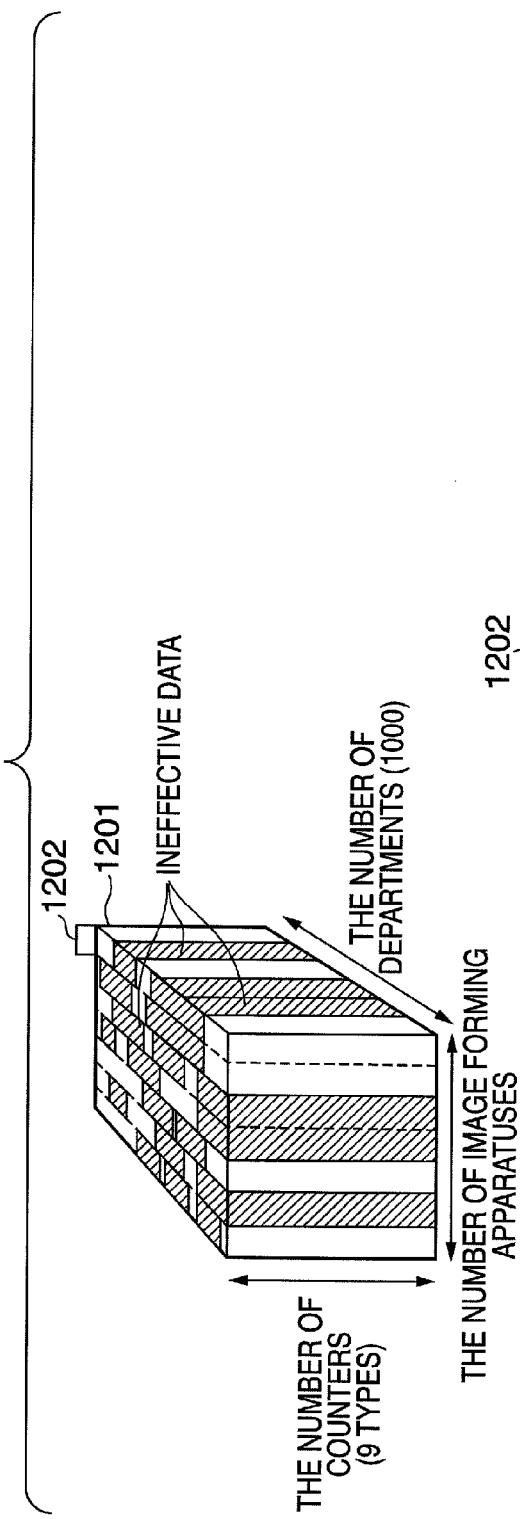
FIG. 12 shows department counter data per image forming apparatus maintained by the central control device 111.

A department counter table 1201 in FIG. 12 shows the entire department counter data stored in the database 112 of the central control device 111. However, shaded portions (ineffective department counters) labeled as "ineffective data" in the department counter table 1201 in FIG. 12 are not stored in the database 112. Department counter data 1202 represents the department counter data per image forming apparatus. In this embodiment, department counters for 1000 departments at the maximum exist per image forming apparatus, each department including nine types of counters. In the counter data 1201, the abscissa in the figure indicates the number of image forming apparatuses maintained as monitored targets by the central control device 111, the ordinate indicates the number of departments (1000 departments) per image forming apparatus, and the height indicates the number of counters (nine counters) per department.

That is, for a conventional database, the volume of this rectangular solid would represent the amount of data registered in the database of the central control device 111. The amount of data in the database 1201 is huge because it corresponds to the amount of the counter data 1202 multiplied by the number of image forming apparatuses. Storing the entire counter data including the ineffective department counters in the database would cause both problems of increased load of database registration processing and a waste of memory capacity.

In the database 1201, the portions indicated as ineffective data represent data not having been updated in a predetermined period (counter values for the ineffective departments), whereas the remaining portions represent periodically updated data (counter values for the effective departments). The present invention reduces the data processing load on the central control device 111 by not registering the counter values for these ineffective departments in the database.

Figure 13:
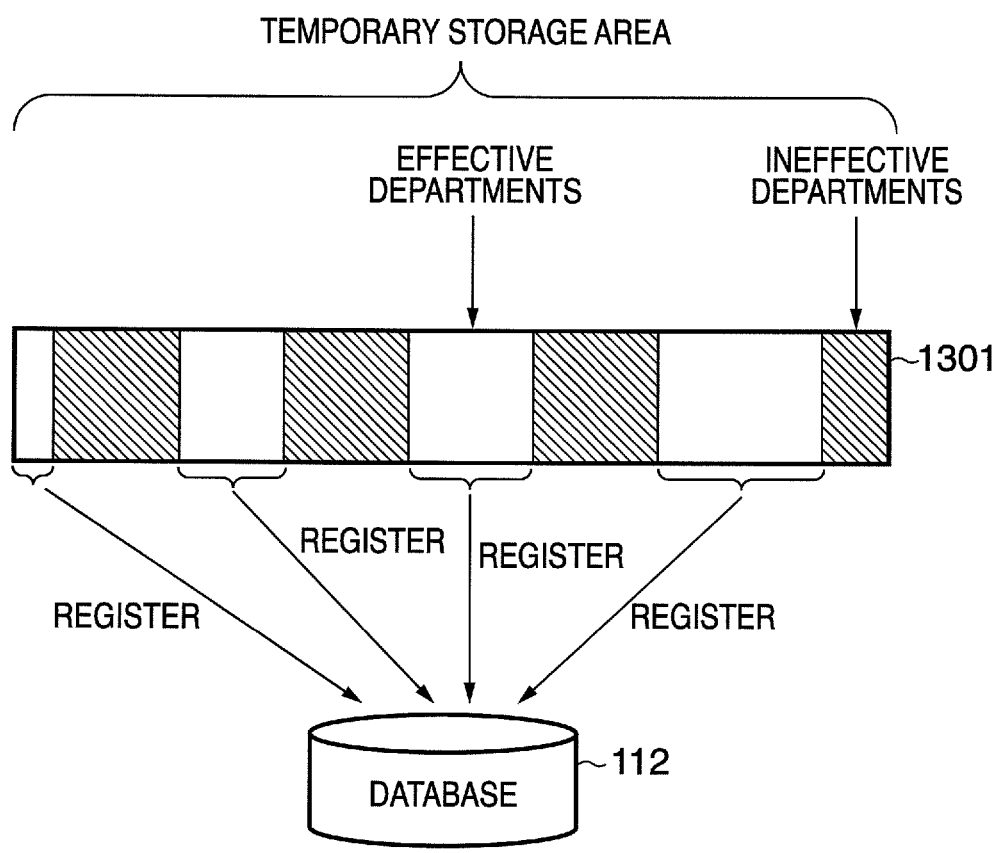
FIG. 13 shows a conceptual view of a temporary storage area used in effective department/ineffective department classification for the department counters.

FIG. 13 shows a temporary storage area 1301 provided in the RAM for use in the effective department/ineffective department classification for the department counters. Although not shown in FIG. 11, this temporary storage area 1301 may be implemented by, for example, using part of the department counter temporary area 1106 or dedicating a separate storage area in the RAM. This temporary storage area is cleared after the effective department/ineffective department classifying processing has been completed and the department counters for the effective departments have been registered in the database 112 of the central control device 111.

Department Counter Registration Processing

Figure 14:
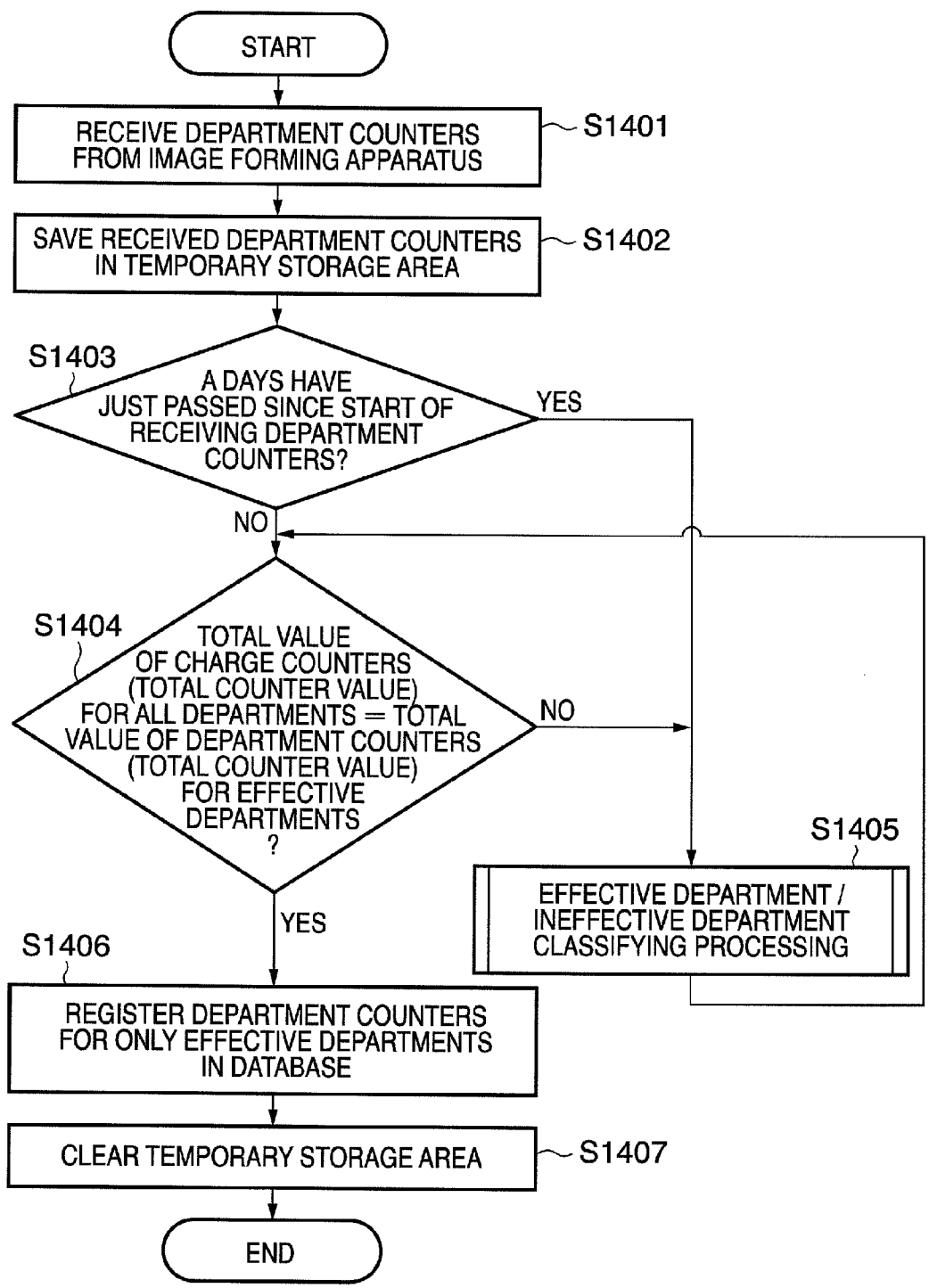
FIG. 14 shows processing after the central control device 111 acquires the department counters from the image forming apparatuses in a flowchart.

FIG. 14 shows a flow of receiving the department counters in the central control device 111. This flow is executed by the first CPU 201 or the second CPU 202. The procedure of FIG. 14 is for one image forming apparatus, so that it is executed each time the department counters are received from any of the image forming apparatuses.

In the initial state, all departments are set as effective departments because it cannot be determined which ones are ineffective departments. This is performed by proceeding through S1401 and S1402, determining NO in S1403, determining YES in S1404, and performing S1406. In the following example, an effective department is a department for which the department counters have been registered in the database 112, whereas an ineffective department is a department for which the department counters have not been registered in the database 112. Therefore, "setting all departments as effective departments" in the initial state means registering received department counters for all departments in the database if the department counters are received for the first time from a certain image forming apparatus.

In S1401, the central control device 111 receives the department counters from the monitoring apparatus 117, 122, or 123 or the image forming apparatus 131. The received department counters are those associated with all departments registered for the image forming apparatus.

In S1402, the department counters received in S1401 are saved in the temporary storage area 1301. In S1403, it is determined whether a predetermined period (A days) has just passed since the first reception of the department counters. This predetermined period is an appropriate period for performing the effective department/ineffective department classification depending on the frequency of use by the customers. The predetermined period is variable in its setting and can employ various time units as its setting unit, such as "hours" and "minutes" as well as "days". Besides time, other parameters may also be used, such as the number of printed sheets. If it is determined in S1403 that the predetermined period has passed, the process transitions to S1405 to perform the effective department/ineffective department classification.

If it is determined in S1403 that it is not the Ath day from the start of reception of the department counters, the process branches to S1404. The path from S1403 to S1405 is taken only once just after the elapse of A days.

In S1404, to validate the effective departments, the total value of the charge counters for all departments and the total value of the department counters only for the effective departments are compared in their respective total counter values. If the values are equal, it can be confirmed that the counter values for the effective departments just match the total counter value. Therefore, only the effective departments are registered in the database in S1406. In S1406, departments are set as storage targets for which the counter values are stored. More specifically, the counter values for the effective departments are registered in association with their registration date and managed as an update history. The update history may be saved only for data up to a predetermined period ago from the current time. The total counter value of the charge counters represents the counter value resulted from all operations (copy, print, scan) in the image forming apparatus, whereas a department counter represents this total charge counter value divided by departments. Therefore, their total values should be equal.

Since the department counter data about the effective departments is stored in the database in S1406, the department counter data temporarily saved in the temporary storage area in S1402 is deleted in S1407. If data about the ineffective departments has been updated in operations performed after completion of the first classifying processing in the S1405, the path from S1404 to S1405 is taken because the counter values are not equal in the processing in S1404. In S1405, the effective department/ineffective department classification is again performed. In this manner, the consistency of the total value of the charge counters with the total value of the department counters can be maintained.

Figure 15:
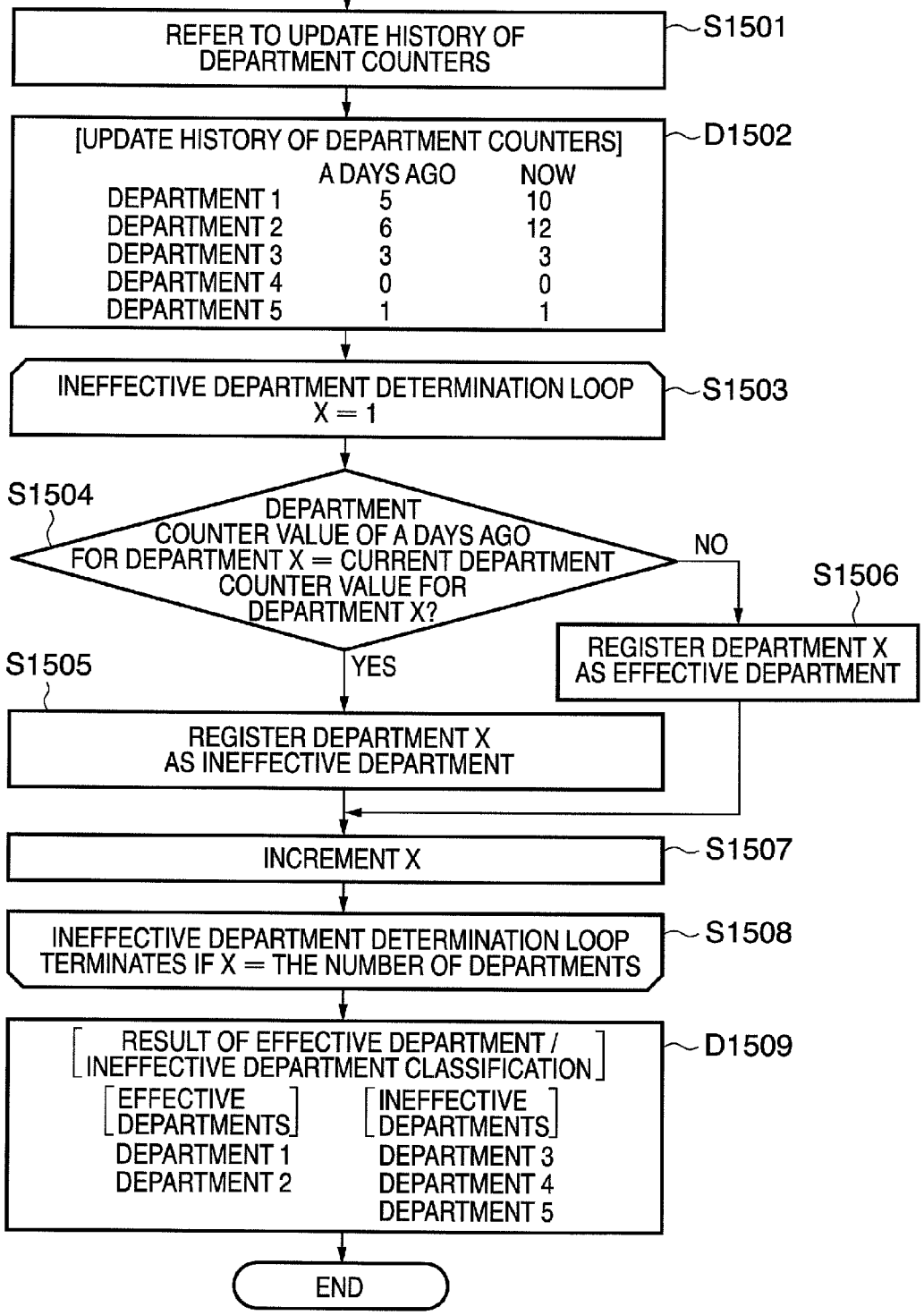
FIG. 15 shows details of effective department/ineffective department classifying processing (S1405) in FIG. 14 in a flowchart.

FIG. 15 describes the processing in S1405 in detail. In S1501, the update history of the department counters is referred to. The update history is data arranged on the basis of database registration dates. An exemplary update history of the department counters referred to in S1501 is shown in D1502. D1502 shows department counter values of A days ago and at the current time for departments 1 to 5. Default department counter values are 0 in both the image forming apparatus and the database.

S1503 represents the start of a loop for performing the effective department/ineffective department classification for the departments shown in D1502. In S1503, a variable "X" indicates the number identifying a department, and its initial value is set to 1. By incrementing "X" (department) in S1507 in the loop from S1503 to S1508, the classification is performed for all departments.

In S1504, the department counter value of A days ago is compared with the current counter value for a department X. The A days here may not be equal to the A days in S1403. The current department counter value indicates the department counter value received in S1401. If the department counter value has not been updated since A days ago, this department is excluded from the storage targets and is set as an ineffective department in S1505. If the department counter value has been updated since A days ago, this department is included in the storage targets and is set as an effective department in S1506. The setting in S1505 and S1506 uses the temporary storage area 1106 used in S1402. Since ineffective departments do not have their update history maintained in the database 112, S1504 is performed on the assumption that the department counter value of A days ago is 0 for ineffective departments.

The department number X is incremented by one in S1507. If this value reaches the total number of departments in S1508, the processing in FIG. 15 terminates.

D1509 shows the result of the effective department/ineffective department classification determined in the loop from S1503 to S1508. The counter values of departments 1 and 2 have been updated between A days ago and the current time. Therefore, it is determined that the customers are continuously using these departments, and these departments are set as effective departments. The counter values of departments 3, 4, and 5 have not been updated between A days ago and the current time. Therefore, it is determined that the customers are not using these departments, and these departments are set as ineffective departments.

FIG. 16 shows counter items that the central control device 111 registers in the database 112 and displays on the web page. FIG. 16 is a mere example, and items such as paper size and part counters may also be included in practice. The central control device 111 writes, in predetermined forms in HTML, charge counters 1602 used for charging processing and department counters 1601 that are counter values on a department basis, and provides (transmits) them to clients. Total counters 1603 are used for comparison with each other in their counter values in the charge counter and department counter comparing unit (step) in S1404. Although the charge counter values are not described as being registered in FIGS. 14 and 15, they are registered along with the department counters.

FIGS. 17A and 17B show an example in which the web page provided by the central control device 111 is displayed at a client. A counter 1701 indicates the total print (total counter) value of the charge counters. A counter 1702 indicates the total print (total counter) value of the department counters for the department ID 0000001. A department ID indicates an ID associated with a department.

The counter 1701 is an item indicating the total counter value per image forming apparatus, whereas the counter 1702 is an item indicating the total counter value per department. Therefore, in S1404, the value of the total counter 1701 is compared with the value of the total counter 1702 per department aggregated for all effective departments. The counter 1702 corresponds to the counter value for one department shown in D1502.

In the above manner, according to the monitoring system in this embodiment, the department counters are classified into those for effective departments and those for ineffective departments to efficiently register the counter data about the effective departments in the database without registering the counter data about the ineffective departments in the database. This allows a reduction in processing load for registering the department counters in the database, and a saving in the memory capacity. Since whether the effective departments are just appropriate is determined normally only by the comparison processing (S1404) with the charge counters, the system load can be further reduced.

Second Embodiment

Increasing Efficiency of Effective Department/Ineffective Department Classifying Processing A second embodiment will be descried for a flow in which the flow in FIGS. 14 and 15 is further elaborated and the efficiency of the central control device 111 is further increased. As the second embodiment, description will be given of a method for efficiently perform the processing (S1404 to S1405) where the data about the ineffective departments are modified after classification of the departments into effective ones and ineffective ones. In the flowchart of FIG. 15, the effective department/ineffective department classifying processing is performed sequentially for each department. However, the classification takes time because 1000 departments exist per image forming apparatus at the maximum. The second embodiment increases the efficiency in the effective department/ineffective department classifying processing by focusing only on data about the ineffective departments and extracting those departments that have their data modified.

Figure 18:
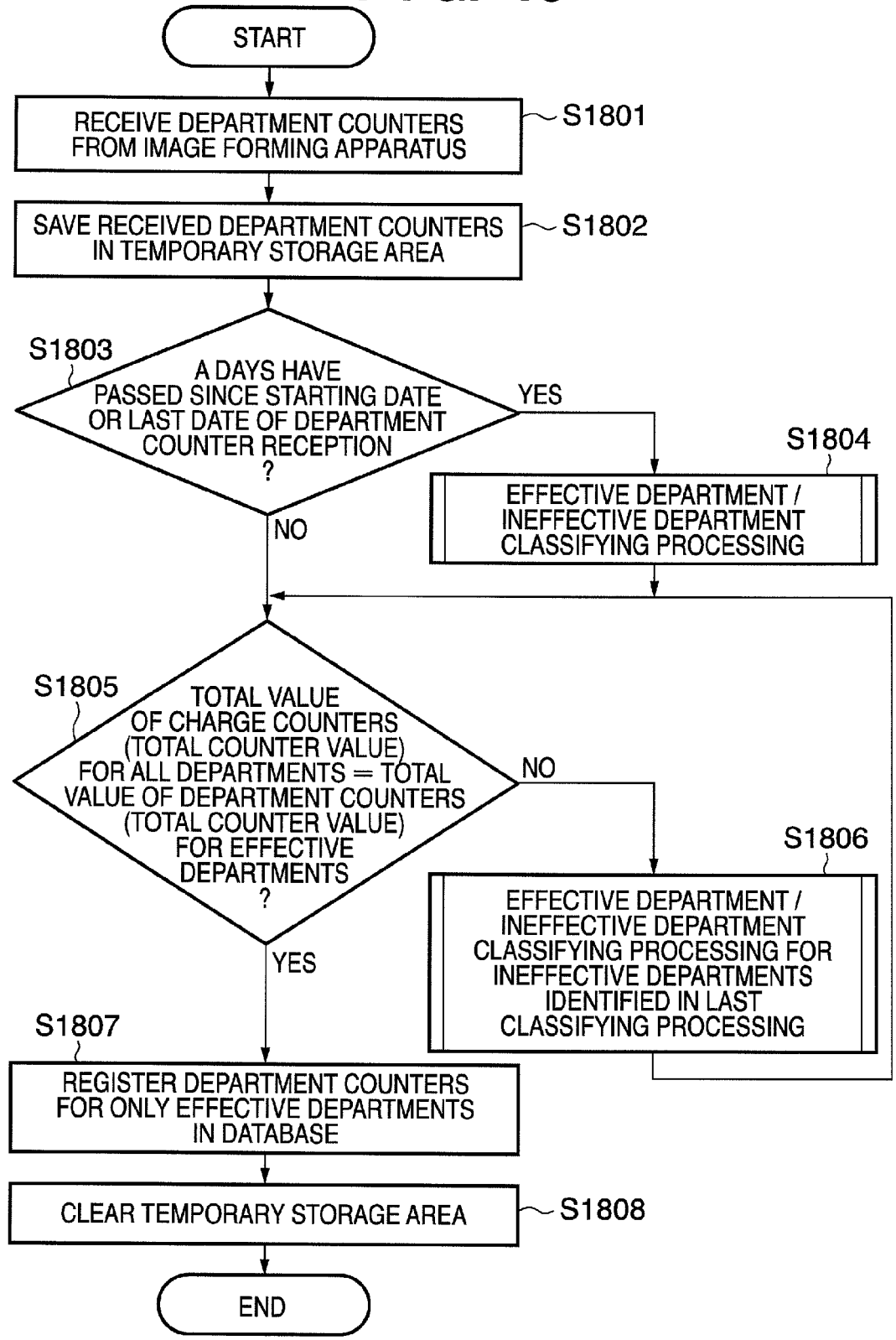
FIG. 18 shows processing as a second embodiment after the central control device 111 acquires the department counters from the image forming apparatuses in a flowchart.

FIG. 18 is a flowchart in which the department counter reception flow in FIG. 14 is made more efficient. A change from FIG. 14 is that the processing in S1403 is performed periodically rather than once at the beginning (S1803). Also, the same processing as in S1405 (FIG. 15) is set as S1804, and new effective department/ineffective department classifying processing is added in S1806. Compared to the first embodiment, this processing in S1806 allows an increase in the computation efficiency when the sum total value of the counter values of each department is not equal to the effective total value of the counter values for the storage target departments. That is, without updating the storage target departments for excluding departments from the storage targets, it is possible to set departments as the storage targets out of the ineffective departments not set as the storage targets. S1806 represents a flow in FIG. 19.

Figure 19:
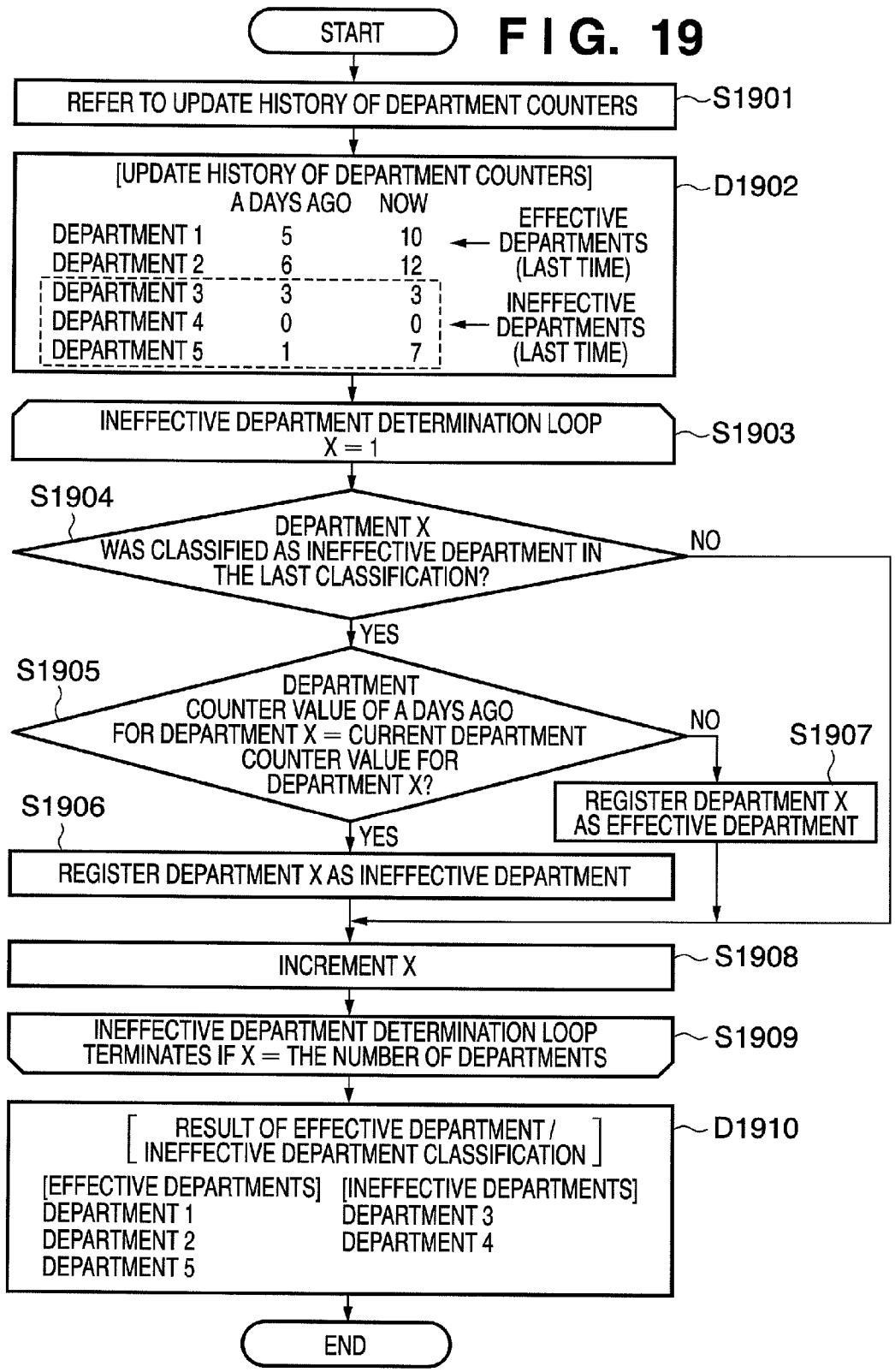
FIG. 19 shows details of the effective department/ineffective department classifying processing (S1806) in FIG. 18 in a flowchart.

FIG. 19 is a flow of the effective department/ineffective department classification in S1806 of FIG. 18. A change from FIG. 15 is that determination in S1904 is added to search the ineffective departments for those having their data modified. That is, while all of the departments 1 to 5 shown in D1902 are processed in FIG. 15, only the departments 3 to 5 registered as ineffective departments (i.e., not registered in the database 112) are processed in FIG. 19. As a result, as in D1910, the "department 5" having its data updated among the ineffective departments is newly registered as an effective department.

In this manner, the focus of the effective department/ineffective department classifying processing can be limited to only previously ineffective departments, which allows this processing to be performed efficiently.

However, since the effective department/ineffective department classification is performed only for the ineffective departments in the flowchart of FIG. 19, only previously ineffective departments can be changed to effective departments. Therefore, changes from effective departments into ineffective departments cannot be detected. This is addressed by performing periodic classifying processing as in S1803.

Thus, according to the second embodiment, more efficient processing can be performed in the central control device 111 by limiting the focus of the effective department/ineffective department classifying processing to only previously ineffective departments.

Third Embodiment

In the description of the first and second embodiments, the central control device 111 executes the flowcharts of FIGS. 14, 15, 18, and 19. However, the present invention is not limited to this manner. Rather, apparatuses such as the monitoring apparatuses 117, 122, and 123 may be provided with the functions of the central control device 111 in the first and second embodiments.

In this case, a monitoring apparatus first receives the department counters and the charge counters from one or more image forming apparatuses via a communication medium such as a network. This is the same as in the first and second embodiments.

Once the department counters and the charge counters are acquired from the one or more image forming apparatuses, the monitoring apparatus executes the flowcharts of FIGS. 14, 15, 18, and 19 based on the acquired counter data. In this manner, the monitoring apparatus can perform the effective department/ineffective department classification for its monitored image forming apparatuses.

However, this embodiment differs from the first and second embodiments in the processing in S1406 and S1807. In this embodiment, the monitoring apparatus performs processing of transmitting the counter data determined to be effective to the central control device 111 in S1406 and S1807 without transmitting the counter data determined to be ineffective to the central control device 111.

This allows the central control device 111 to receive only the counter data that should be registered in the database from each monitoring apparatus, thereby reducing the processing of registering data in the database.

In this manner, providing the monitoring apparatuses with the same functions as the central control device 111 in the first and second embodiments also allows a reduction in processing load on the central control device 111 for registering the counter data in the database, and a saving in the memory capacity.

Other Embodiments

The present invention may be applied to a system composed of a plurality of devices (e.g., a host computer, an interface device, a reader, and a printer) or to an apparatus implemented as a single device (e.g., a copier or a facsimile machine). Objects of the present invention may be achieved in such a manner that a recording medium storing program code for implementing the functions of the above-described embodiments is supplied to the system or apparatus, and a computer in the system or apparatus reads out and executes the program code stored in the recording medium. In this case, the program code itself read out from the recording medium implements the functions of the above-described embodiments, and the program code itself and the recording medium storing the program code are included in the present invention.

The present invention covers the case where an Operating System (OS) or the like running on the computer performs part or all of actual processing under instructions of the program code to implement the functions of the above-described embodiments. The present invention is further applied to the case where the program code read out from the recording medium is written to memory provided in a function extension card inserted into the computer or in a function extension unit connected to the computer. In this case, a CPU or the like provided in the function extension card or function extension unit performs part or all of actual processing under instructions of the written program code to implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-261418, filed Sep. 26, 2006, which is hereby incorporated by reference herein in its entirety.

What is claimed is:

1. A management apparatus that manages counters of each department for at least one image forming apparatus, comprising:
    a setting unit configured to set departments as storage targets for a storage unit that stores counter values;
    a receiving unit configured to receive counter values of each department for the at least one image forming apparatus;
    a comparing unit configured to compare a sum total value representing the sum of the counter values of all of the departments with an effective total value representing the sum of counter values of the storage target departments among the counter values of all of the departments received by said receiving unit; and
    a storage control unit configured to store, in the storage unit, the counter values received by said receiving unit corresponding to the storage target departments set by said setting unit without storing the counter values received by said receiving unit corresponding to an ineffective department which is not set as the storage target, if the comparison by said comparing unit indicates that the sum total value and the effective total value are equal,
    wherein if the comparison by said comparing unit indicates that the sum total value and the effective total value are not equal, said setting unit is configured to update the storage target departments so as to set a storage target department out of ineffective departments, and said storage control unit is configured to store, in the storage unit, the counter values of the updated storage target departments.

2. The management apparatus according to claim 1, wherein
    said setting unit is configured to exclude counter values of departments not having been updated in a predetermined period from the storage targets and to include counter values of departments having been updated in the predetermined period in the storage targets, and
    said setting unit is configured to update the storage target departments if the comparison by said comparing unit indicates that the sum total value and the effective total value are not equal.

3. The management apparatus according to claim 1, further comprising a determination unit configured to determine whether or not a predetermined period has passed since the last reception of the counter values of each department when the counter values are received by said receiving unit, wherein
    said setting unit is configured to exclude counter values of departments not having been updated in a predetermined period from the storage targets and to include counter values of departments having been updated in the predetermined period in the storage targets, and
    said setting unit is configured to update the storage target departments if the determination by said determination unit indicates that the predetermined period has passed.

4. The management apparatus according to claim 1, further comprising a providing unit configured to provide the counter values for each department stored in the storage unit to a client terminal connected through communication.

5. The management apparatus according to claim 1, wherein the sum total value representing the sum of the counter values of each department is a charge counter value.

6. A management method in a management apparatus that manages counters of each department for at least one image forming apparatus, comprising:
    a setting step of setting departments as storage targets for a storage unit that stores counter values;

a receiving step of receiving counter values of each department for the at least one image forming apparatus;

a comparing step of comparing a sum total value representing the sum of the counter values of all of the departments with an effective total value representing the sum of counter values of the storage target departments among the counter values of all of the departments received by said receiving step; and a storage control step of storing, in the storage unit, the counter values received by said receiving step corresponding to the storage target departments set by said setting step without storing the counter values received in the receiving step corresponding to an ineffective department which is not set as the storage target, if the comparison by said comparing step indicates that the sum total value and the effective total value are equal, wherein if the comparison in the comparing step indicates that the sum total value and the effective total value are not equal, the storage target departments are updated in the setting step so as to set a storage target department out of ineffective departments, and the counter values of the updated storage target departments are stored in the storage at the storage control step, and wherein each of said steps are implemented, at least in part, by a computer in the management apparatus.

7. The management method according to claim 6, wherein if the comparison by said comparing step indicates that the sum total value and the effective total value are not equal, said setting step updates which of the departments are set as the storage target departments, and said storage control step stores, in the storage unit, the counter values received by said receiving step corresponding to the updated storage target departments.

8. The management method according to claim 6, wherein said setting step excludes counter values of departments not having been updated in a predetermined period from the storage targets and includes counter values of departments having been updated in the predetermined period in the storage targets, and said setting step updates the storage target departments if the comparison by said comparing step indicates that the sum total value and the effective total value are not equal.

9. The management method according to claim 6, further comprising a determination step of determining whether or not a predetermined period has passed since the last reception of the counter values of each department when the counter values are received by said receiving step, wherein said setting step excludes counter values of departments not having been updated in a predetermined period from the storage targets and includes counter values of departments having been updated in the predetermined period in the storage targets, and said setting step updates the storage target departments if the determination by said determination step indicates that the predetermined period has passed.

10. The management method according to claim 6, wherein if the comparison by said comparing step indicates that the sum total value and the effective total value are not equal, said setting step sets storage target departments out of ineffective departments not set as the storage targets without performing an update for excluding storage target departments from the storage targets.

11. The management method according to claim 6, further comprising a providing step of providing the counter values for each department stored in the storage unit to a client terminal connected through communication.

12. The management method according to claim 6, wherein the sum total value representing the sum of the counter values of each department is a charge counter value.

13. A non-transitory computer-readable recording medium storing a computer-executable management program configured to cause at least a computer to manage counters of each department for at least one image forming apparatus, the program comprising:

setting instructions configured to set departments as storage targets for a storage unit that stores counter values;

receiving instructions configured to receive counter values of each department for the at least one image forming apparatus;

comparing instructions configured to compare a sum total value representing the sum of the counter values of all of the departments with an effective total value representing the sum of counter values of the storage target departments among the counter values of all of the departments received according to said receiving instructions; and storage control instructions configured to store, in the storage unit, the counter values received according to said receiving instructions corresponding to the storage target departments set according to said setting instructions without storing the counter values received according to said receiving instructions corresponding to an ineffective department which is not set as the storage target, if the comparison according to said comparing instructions indicates that the sum total value and the effective total value are equal, wherein if the comparison according to said comparing instructions indicates that the sum total value and the effective total value are not equal, said setting instructions are configured to update the storage target departments so as to set a storage target department out of ineffective departments, and said storage control instructions are configured to store, in the storage unit, the counter values of the updated storage target departments.

* * * * *